United States Patent
Matsufuru (10) Patent No.: US 6,922,392 B2
(45) Date of Patent: Jul. 26, 2005

(54) POLICING CONTROL METHOD AND APPARATUS, AND NETWORK SYSTEM USING THE POLICING CONTROL APPARATUS

(75) Inventor: Norio Matsufuru, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 329 days.

(21) Appl. No.: 10/377,795

(22) Filed: Mar. 4, 2003

(65) Prior Publication Data

US 2003/0128667 A1 Jul. 10, 2003

Related U.S. Application Data (63) Continuation of application No. PCT/JP02/06910, filed on Jul. 8, 2002.

(30) Foreign Application Priority Data

Dec. 14, 2001 (JP) ........................... 2001-382227

(51) Int. Cl.[7] ................................................. H04J 1/16
(52) U.S. Cl. ................................ 370/230.1; 370/235.1; 370/252
(58) Field of Search ................................ 370/230, 230.1, 370/235, 235.1, 252, 395.1

(56) References Cited

U.S. PATENT DOCUMENTS

| | | | | |
|---|---|---|---|---|
| 5,666,353 A | * | 9/1997 | Klausmeier et al. | 370/230 |
| 5,668,797 A | * | 9/1997 | Fahmi et al. | 370/229 |
| 5,930,234 A | | 7/1999 | Yoshida | 370/232 |
| 6,108,303 A | * | 8/2000 | Fahmi et al. | 370/230 |
| 6,381,214 B1 | * | 4/2002 | Prasad | 370/230.1 |
| 6,628,614 B2 | * | 9/2003 | Okuyama et al. | 370/230.1 |
| 6,754,182 B1 | * | 6/2004 | Aznar et al. | 370/252 |

FOREIGN PATENT DOCUMENTS

| | | |
|---|---|---|
| JP | 9-186699 | 7/1997 |
| JP | 9-224034 | 8/1997 |

* cited by examiner

*Primary Examiner*—Frank Duong
*Assistant Examiner*—Melanie Jagannathan
(74) *Attorney, Agent, or Firm*—Oblon, Spivak, McClelland, Maier & Neustadt, P.C.

(57) ABSTRACT

Polishing judgment is performed using an algorithm in which an intermediate variable [K] is provided before judging a time difference between an estimated arrival time [TAT] of a packet and an actual packet arrival time [t(k)], and to which a unit is added. The unit calculates [K=TAT−t(k)], and compares the calculated value with a counter overflow judgment time [M] obtained from a sum [L+D] of a packet arrival permissible time [L] and a standard packet interarrival time [D].

11 Claims, 9 Drawing Sheets

POLICING CONTROL METHOD AND APPARATUS, AND NETWORK SYSTEM USING THE POLICING CONTROL APPARATUS

TECHNICAL FIELD

This invention relates to a policing control method and apparatus that monitors the traffic volume of packets flowing on a network to perform flow control in a network system, and a network system using the policing control apparatus.

BACKGROUND ART

Conventionally, this type of network system includes, for example, one in which packets flow like a burst on a network such as an ATM (Asynchronous Transfer Mode) network in a subscriber loop, that is, the packets flow, requiring a large transmission band in a short period of time. In such a network system, if a user (for example, a subscriber's personal computer, hereinafter referred to as "subscriber's PC") is allowed to transmit cells in a free traffic volume, a particular subscriber's PC may transmit cells in a large-capacity traffic volume, due to a difference in frequency of transmitting information between users. Therefore, this network system has a problem such that the traffic volume of cells that can be transmitted by some other subscriber's PC may become small, or cell transmission by some other subscriber's PC may not be performed, and hence equity between the users in the packet transmission cannot be ensured.

In this network system, if a packet (an ATM cell) that acts against the code for packet transmission, flows in the network, it may adversely affect the traffic in the communication line, to deteriorate the transmission quality for other users.

Therefore, conventionally, an upper limit of packet volume that can be transmitted per unit time, is determined by an agreement between common carrier of the network who builds the network system and users. Policing control is then performed for checking whether the subscriber's PC is transmitting packets in the traffic volume within the agreed range, by a relay apparatus such as an edge router provided in this network.

For example, the basic concept of the policing control in the ATM network is UPC (Usage Parameter Control), and this policing control is realized by discarding a packet that does not satisfy this usage parameter. The judgment conditions for passing or discarding the packet by this policing control are set by a PCR (Peak Cell Rate) monitoring algorithm and a CDTV (Call Delay Variation Tolerance).

Figure 1:
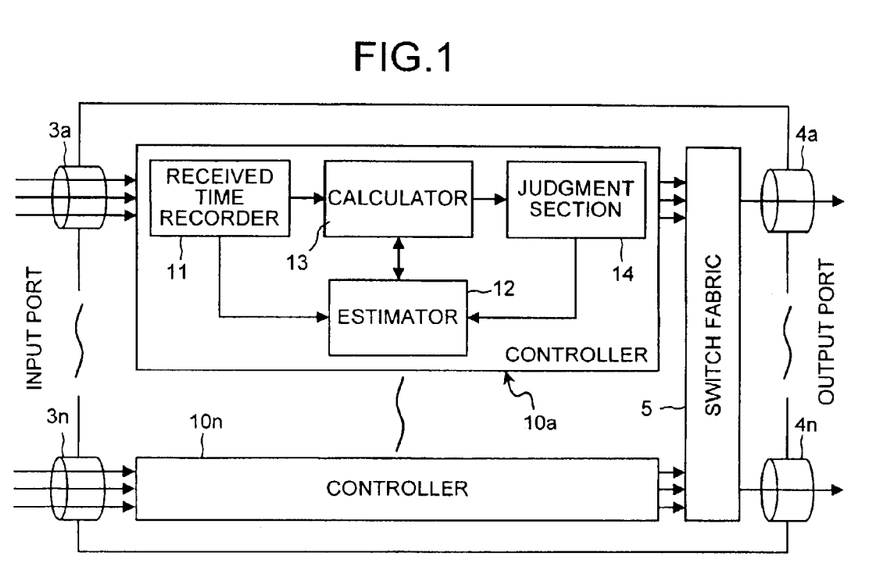
FIG. 1 shows a diagram of the schematic configuration of a policing control apparatus.

A router having such a policing control function comprises, as shown in FIG. 1 that shows the schematic configuration thereof, controllers $10a$ to $10n$ (n is an optional integer) each including a received time recorder 11 that records a received time of a packet, an estimator 12 that estimates an arrival time of the next packet, a calculator 13 that carries out calculation processing in a policing control apparatus, and a judgment section 14 that judges passage or discarding of the packet, based on the information for the packet received time recorded in the received time recorder 11 and the estimated arrival time of the next packet estimated by the estimation unit 12. This router has a plurality of input ports $3a$ to $3n$ (n is an optional integer), being a physical port provided for each line, and the controller 10 is provided respectively for each of the input ports $3a$ to $3n$.

The router also comprises a plurality of output ports $4a$ to $4n$ (n is an optional integer), being a physical port, and a switch fabric 5 that selects an output port suitable for outputting a packet subjected to policing judgment, from the output ports $4a$ to $4n$. In FIG. 1, the arrows shown on the input ports $3a$ to $3n$ and the output ports $4a$ to $4n$ and 2 indicate a direction of a packet input to the router or output from the router.

Figure 2:
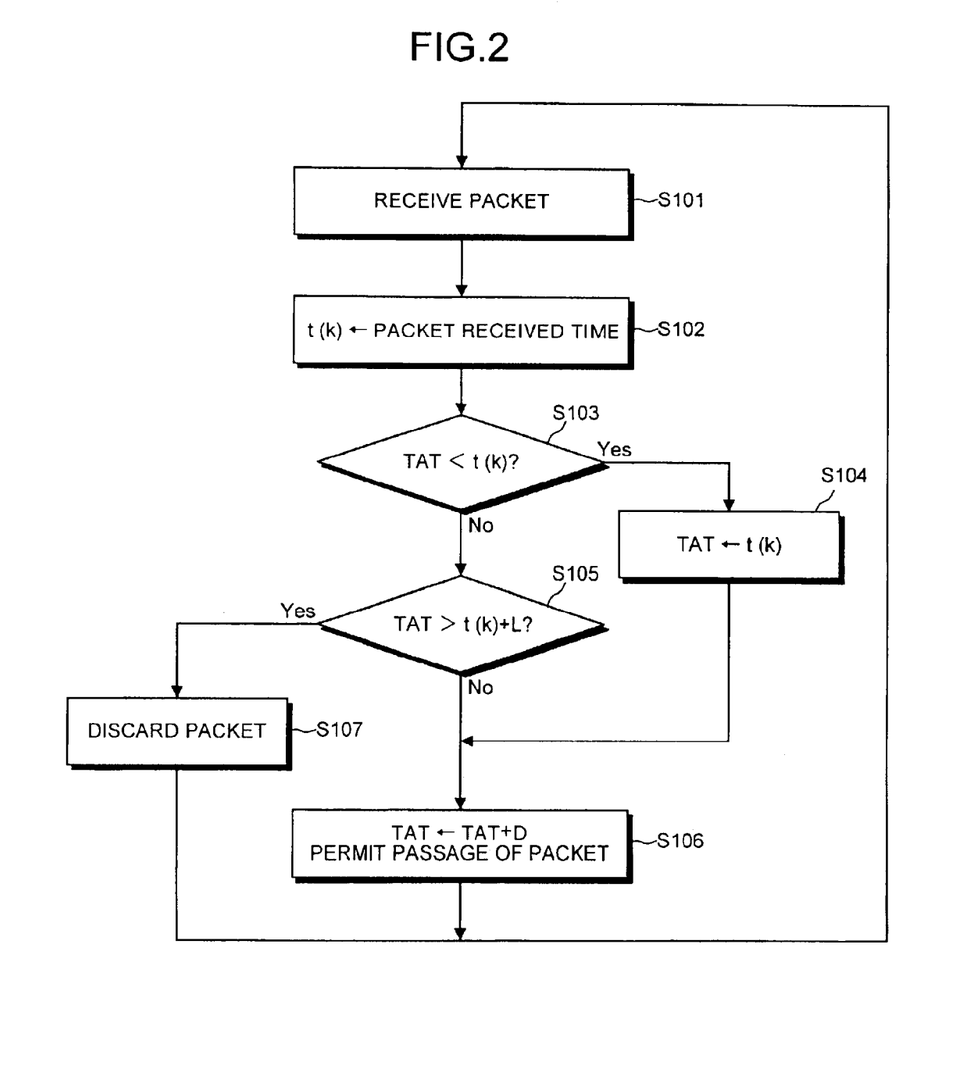
FIG. 2 shows a flowchart of the control algorithm of the conventional policing control apparatus.

The policing judgment in each controller $10a$ to $10n$ of the router (policing control apparatus) is executed based on a virtual scheduling algorithm as shown in FIG. 2. The sequence of this processing will be explained as follows. For example, when a packet is received at time [t(k)] (k is an optional integer) (step 101), the received time [t(k)] of this packet is first recorded (step 102). The value of the estimated packet arrival time [TAT (Theoretical Arrival Time)] obtained in advance as described later is compared with the packet received time [t(k)] (step 103).

Figure 3:
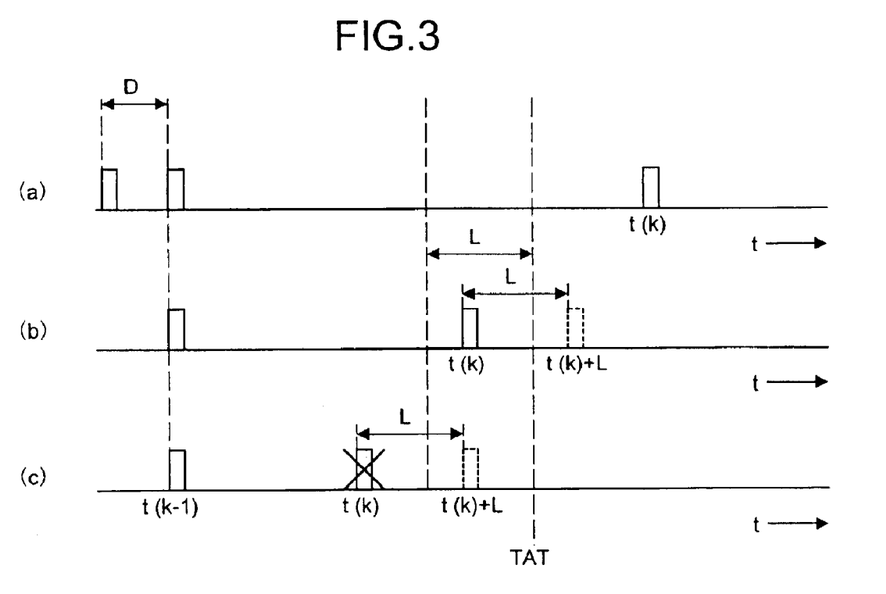
FIG. 3 shows a timing chart of the concept of policing control of packets.

When the packet received time [t(k)] is later than the estimated packet arrival time [TAT], as shown in FIG. 3(a), an interarrival time of this packet is long. Therefore, it is judged that it suits the policing rate, and the packet is permitted, and the estimated arrival time of the next packet is calculated (step 104, step 106).

When the packet received time [t(k)] is equal to or earlier than the estimated packet arrival time [TAT] (step 103), an additional value [t(k)+L] obtained by adding a packet arrival permissible time [L] described later to the packet received time [t(k)] is compared with the estimated packet arrival time [TAT] (step 105).

When this additional value [t(k)+L] is equal to or exceeds the estimated packet arrival time [TAT], as shown in FIG. 3(b), a timing of receiving the packet is within the packet arrival permissible time [L], and hence the passage of the packet is permitted, and the estimated packet arrival time [TAT] of the next packet is calculated based on the estimated packet arrival time [TAT] of the packet (step 106). In this calculation, the estimated packet arrival time [TAT] is designated as the received time [t(k)] of this packet, and an interarrival time [D] of a standard packet expressed by an inverse number of the allowable packet rate is added to [t(k)], to thereby determine an estimated packet arrival time [TAT] of the next packet.

On the other hand, at step 105, when the additional value [t(k)+L] obtained by adding the packet arrival permissible time [L] to the packet received time [t(k)] is earlier than the estimated packet arrival time [TAT], as shown in FIG. 3(c), the transmission interval of the packet is shorter than a defined interval. Therefore, this packet is judged as a non-conforming packet, and discarded (step 107). The operation of this virtual scheduling algorithm is repeatedly carried out every time a packet is received.

In this manner, the virtual scheduling algorithm determines whether a packet is to be passed through or discarded, by comparing the time [t(k)] when the packet is received and the estimated time [TAT] when the packet is to be received originally.

In this conventional example, if the value of the packet arrival permissible time [L] is increased, the number of packets to be discarded can be reduced. However, in this conventional example, it is resultantly permitted to pass through the packet at a rate higher than the agreed rate in a short period of time. Therefore, in this conventional example, a value of the packet arrival permissible time [L] suitable for the network system, to which the policing control apparatus is applied, is registered in the estimation unit 12 in advance.

In this policing judgment, the estimated time [TAT] managed by a counter and the packet received time [t(k)] are handled as a real number not smaller than 0. In the actual router, however, the counter is realized as a counter having a finite bit length, and if a certain period of time is exceeded, the count value of the counter returns to 0. Therefore, there is a possibility that false reversal takes place between the packet received time and the estimated packet arrival time, to thereby misinterpret the policing judgment.

Figure 4:
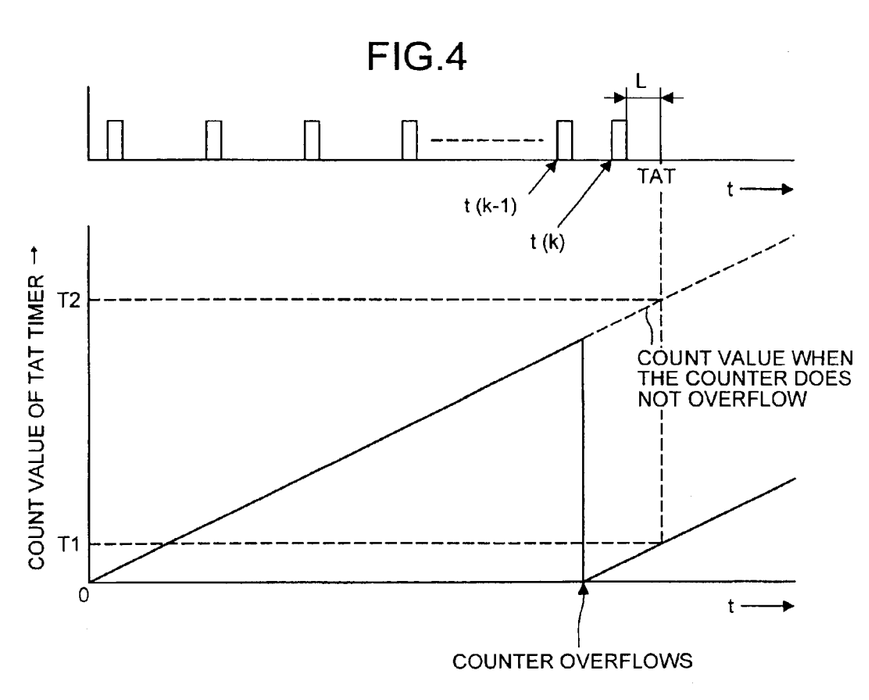
FIG. 4 shows a diagram of the count situation of a counter.

For example, there may be a case such that when the standard packet interarrival time [D] expressed by an inverse number of the permissible packet rate is added to the estimated arrival time [TAT] of the previous packet to calculate the estimated arrival time of the next packet, a value as a result of the estimated packet arrival time [TAT] should become [T2] originally, as shown in FIG. 4, but actually the counter overflows and the [TAT] becomes [T1] ([T1]<[T2]), and the value returns to about 0. In this state, in the original counter operation, the estimated packet arrival time [TAT] should become larger (the time is delayed) than the packet arrival time [t(k)], but the estimated packet arrival time [TAT] becomes smaller (the time becomes earlier), due to the overflow of the counter. This means that a packet supposed to be discarded is allowed to pass through.

Further, when the packet flow is stagnant for some time and the packets are received, the counter of the packet arrival time [t(k)] may overflow and show a value near 0, as is the case where the counter of the estimated packet arrival time [TAT] overflows. In this case, when the value of the estimated packet arrival time [TAT] is large (the time is delayed), a packet supposed to be passed through is discarded. Hence, packets are continuously discarded by the policing control apparatus until the packet arrival time [t(k)] exceeds the estimated packet arrival time [TAT] (until the time is delayed).

DISCLOSURE OF THE INVENTION

It is an object of this invention to provide a policing control method and apparatus capable of performing policing judgment accurately even when a count value of a counter overflows and the count value exceeds the boundary of 0 from the maximum value to thereby cause false reversal of time, and a network system using the policing control apparatus.

In order to solve the above problems and achieve the object, the policing control method according to this invention restricts passage of packets transmitted on a network in a different traffic volume. The policing control method comprises an arrival time detection step of detecting an arrival time of a packet when the packet arrives; a setting step of presetting an estimated packet arrival time and a packet arrival permissible time; a calculation step of calculating a time difference between the detected packet arrival time and the preset estimated packet arrival time; a first judgment step of judging a difference in magnitude between the calculated time difference and an additional value by comparing the time difference with the additional value obtained by adding a standard interval time of packets to the preset packet arrival permissible time; a second judgment step of judging a difference in magnitude between the time difference and the packet arrival permissible time by comparing the time difference and the packet arrival permissible time, when it is judged at the first judgment step that the time difference is not larger than the additional value; a discarding step of discarding the packet, when it is judged at the second judgment step that the time difference is larger than the packet arrival permissible time; and a permitting step of permitting passage of the packet, when it is judged at the first judgment step that the time difference is larger than the additional value, or it is judged at the second judgment step that the time difference is not larger than the packet arrival permissible time.

The policing control method according to this invention based on the above-described invention, further comprises a resetting step of resetting a sum of the estimated packet arrival time and the standard interval time of packets as a new estimated packet arrival time, when the passage of the packet is permitted at the permitting step.

The policing control method according to this invention based on the above-described invention, further includes a resetting step of resetting a value obtained by adding the estimated packet arrival time to a time consisting of a product of a standard bit interval and a packet length of the arrived packet, as a new estimated packet arrival time, when the passage of the packet is permitted at the permitting step.

The policing control apparatus according to this invention restricts passage of packets transmitted on a network in a different traffic volume. The policing control apparatus comprises a detection unit that detects an arrival time of a packet; a calculation unit that calculates a time difference between the packet arrival time and a preset estimated packet arrival time; a first comparison unit that compares the calculated time difference with an additional value obtained by adding a standard interval time of packets to a preset packet arrival permissible time; a second comparison unit that compares the time difference with the packet arrival permissible time, based on a result of the comparison by the first comparison unit; and a permitting unit that permits passage of the packet or discarding of the packet, based on the comparison result by the first comparison unit, or the comparison results by the first and second comparison units.

The policing control apparatus according to this invention based on the above-described invention, further comprises a setting unit that sets a sum of the estimated packet arrival time and the standard interval time of packets as a new estimated packet arrival time, when the permitting unit permits the passage of the packet.

The policing control apparatus according to this invention based on the above-described invention, further comprises a setting unit that sets a value obtained by adding the estimated packet arrival time to a time consisting of a product of a standard bit interval and a packet length of the arrived packet, as a new estimated packet arrival time, when the permitting unit permits the passage of the packet.

In the policing control apparatus according to this invention based on the above-described invention, the permitting unit permits the passage of the packet, when the time difference is larger than the additional value based on the comparison result by the first comparison unit, or when the time difference is not larger than the additional value based on the comparison result by the first comparison unit and the time difference is not larger than the packet arrival permissible time based on the comparison result by the second comparison unit.

In the policing control apparatus according to this invention based on the above-described invention, the permitting unit discards the packet, when the time difference is not larger than the additional value based on the comparison result by the first comparison unit and when the time difference is larger than the packet arrival permissible time based on the comparison result by the second comparison unit.

In the policing control apparatus according to this invention based on the above-described invention, the calculation unit has a counter for managing interval times of the transmitted packets, and a maximum measurement time of the counter is set to a time sufficiently larger than a sum of a maximum value of a bucket counter in a leaky bucket algorithm and a minimum interval time of packets.

The network system according to this invention is built by at least a plurality of subscriber hosts and a backbone network for performing transfer of packets between the subscriber hosts and the backbone network. The system comprises the policing control apparatus according to any one of claims 4 to 9 that is connected between the subscriber hosts and the backbone network, and restricts passage of the packets in a different traffic volume.

In this invention, a time difference between the packet arrival time and the estimated arrival time of the packet is designated as an intermediate variable, and the passage of the packet is permitted based on a comparison result between this intermediate variable and a counter overflow judged time obtained by adding a standard interval time of packets to a packet arrival permissible time, and based on a comparison result between this intermediate variable and the packet arrival permissible time. Therefore, even when the count value of the counter exceeds a boundary of 0 from the maximum value to cause a false reversal of time, the policing judgment can be carried out accurately.

Furthermore, according to this invention, even when the reversal of counter occurs in a network in which the packet length is variable, the frequency band (bps) used for the packet flow can be controlled accurately.

BEST MODE FOR CARRYING OUT THE INVENTION

Preferred embodiments of the policing control method and apparatus and the network system using the policing control apparatus according to the present invention, will be explained in detail below with reference to the drawings.

Figure 5:
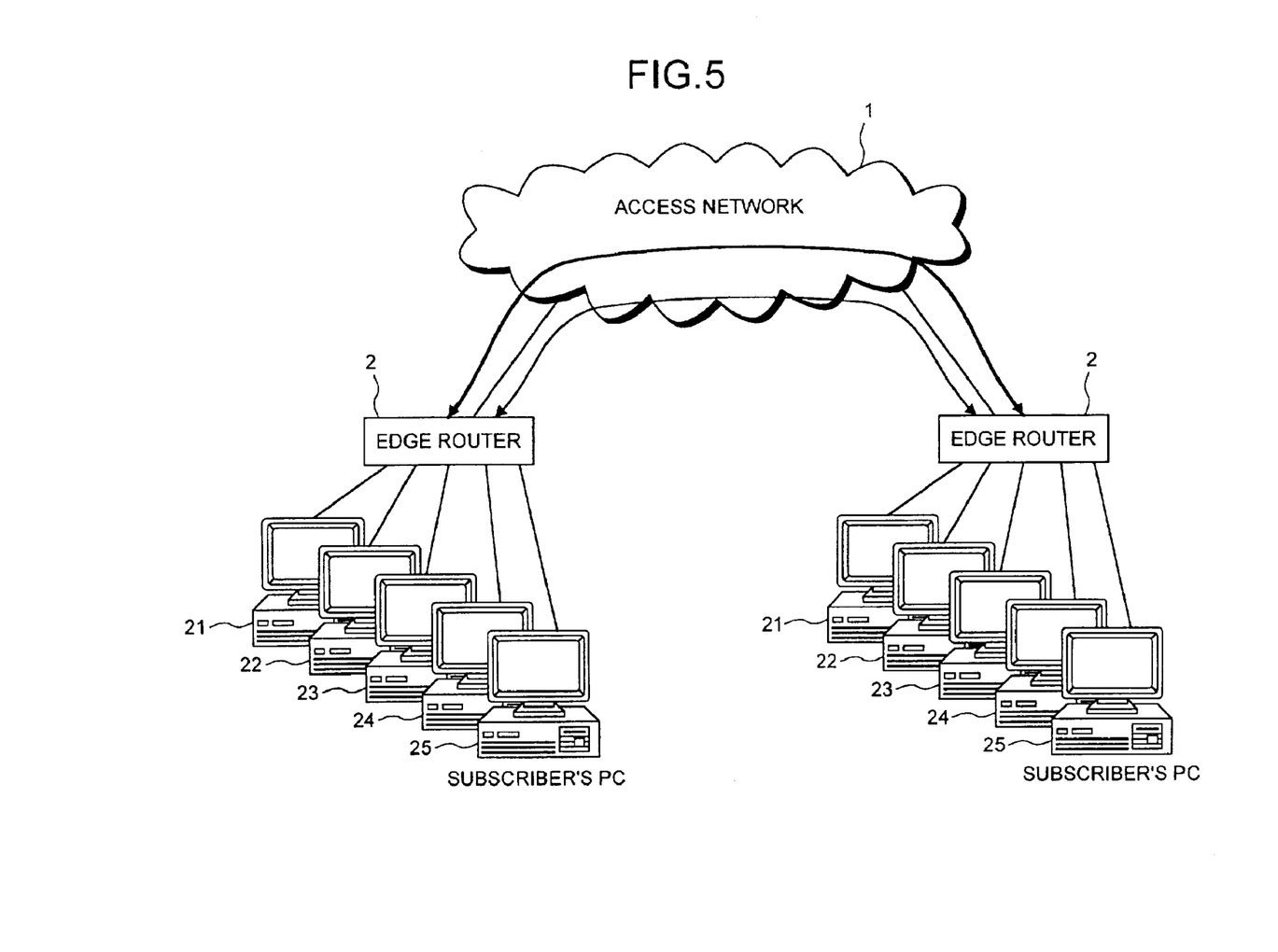
FIG. 5 shows a system block diagram of the configuration of the network system according to this invention.

A first embodiment of this invention will be explained first. FIG. 5 shows a system block diagram of the configuration of the network system according to this invention. In this figure, this network system includes an access network 1 such as ATM, a policing control apparatus 2 referred to as an edge router that is connected to the access network 1 and performs data relay of a cell, for example, being a packet having a fixed length, and subscriber' PCs 21 to 25 connected to the policing control apparatus 2. The policing control apparatus 2 has a function of performing policing control, and monitors whether the cell traffic is as agreed so that data transmission becomes possible in line with the agreement between a network connection service provider (for example, communication service operating company) existing in the ATM network and users, being subscribers (subscriber's PCs), to discard a cell breaching the agreement without sending the cell to the ATM network.

The policing control apparatus 2 according to this invention basically comprises input ports $3a$ to $3n$, output ports $4a$ to $4n$, a switch fabric 4, and a plurality of controllers $10a$ to $10n$ each having a received time recorder 11, an estimator 12, a calculator 13, and a judgment section 14, similar to those of the conventional policing control apparatus as shown in FIG. 1.

The different point of the policing control apparatus 2 from the conventional policing control apparatus is that a time difference [K] between the estimated packet arrival time and the packet received time is obtained, to thereby execute an algorithm for comparing the time difference [K] with a counter overflow judgment time [M] obtained by the sum of a packet arrival permissible time [L] and a standard packet interarrival time [D].

The calculator 13 also has a counter (not shown) for managing the packet intervals. The maximum measurement time of this counter is set to a value [N] sufficiently larger than the counter overflow judgment time [M]. The packet arrival permissible time [L] is defined as one showing a depth (memory capacity of a buffer) of a bucket (leaky bucket=buffer) in for example a leaky bucket algorithm. For example, if it is assumed that the depth of the bucket is for five packets, the packet arrival permissible time [L] becomes [L=5D].

Figure 6:
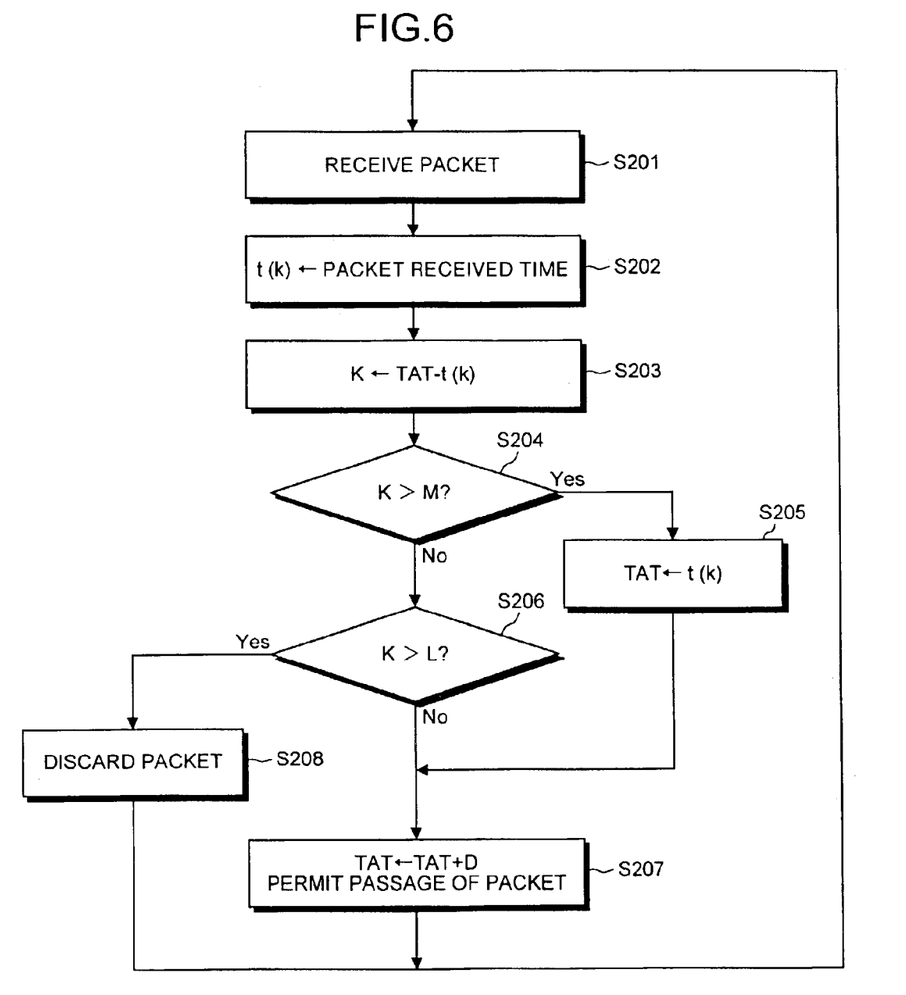
FIG. 6 shows a flowchart of the control algorithm of a policing control apparatus according to one embodiment of this invention.

FIG. 6 shows a diagram of the algorithm of the policing judgment operation of the policing control apparatus 2 according to this invention. The controllers $10a$ to $10n$ in the policing control apparatus 2 perform the similar policing judgment operation, and hence the policing judgment operation of the controller $10a$ as a representative thereof will be explained herein.

At first, when having received a packet from the input port $3a$ (step 201), the controller $10a$ in the policing control apparatus 2 records a received time [t(k)] of this packet in the received time recorder 11 (step 202). The calculator 13 then calculates a time difference [K=TAT−t(k)] between the estimated packet arrival time [TAT] obtained by the estimator 12 beforehand and the packet received time [t(k)] (step 203).

The judgment section 14 then compares this obtained time difference [K] with the counter overflow judgment time [M], being the sum of the packet arrival permissible time [L] and the standard packet interarrival time [D] (step 204).

At step 204, if the comparison result by the judgment section 14 is such that the time difference [K] is larger than the counter overflow judgment time [M], the judgment section 14 permits the passage of the received packet, and replaces the estimated packet arrival time [TAT] by [t(k)], and adds the standard packet interarrival time [D] thereto to thereby obtain the next estimated packet arrival time [TAT] (step 205 and step 207).

On the other hand, at step 204, when this time difference [K] is not larger than the counter overflow judgment time [M], the judgment section 14 compares the time difference [K] with the packet arrival permissible time [L] (step 206).

When the time difference [K] is not larger than the packet arrival permissible time [L], the judgment section 14 permits the passage of this packet, and adds the standard packet interarrival time [D] to the estimated arrival time [TAT] of this packet, to thereby obtain the next estimated packet arrival time [TAT] (step 207).

At step 206, if the time difference [K] is larger than the packet arrival permissible time [L], the judgment section 14 judges that the interarrival time of this packet is too short, and discards this packet (step 208).

Figure 7:
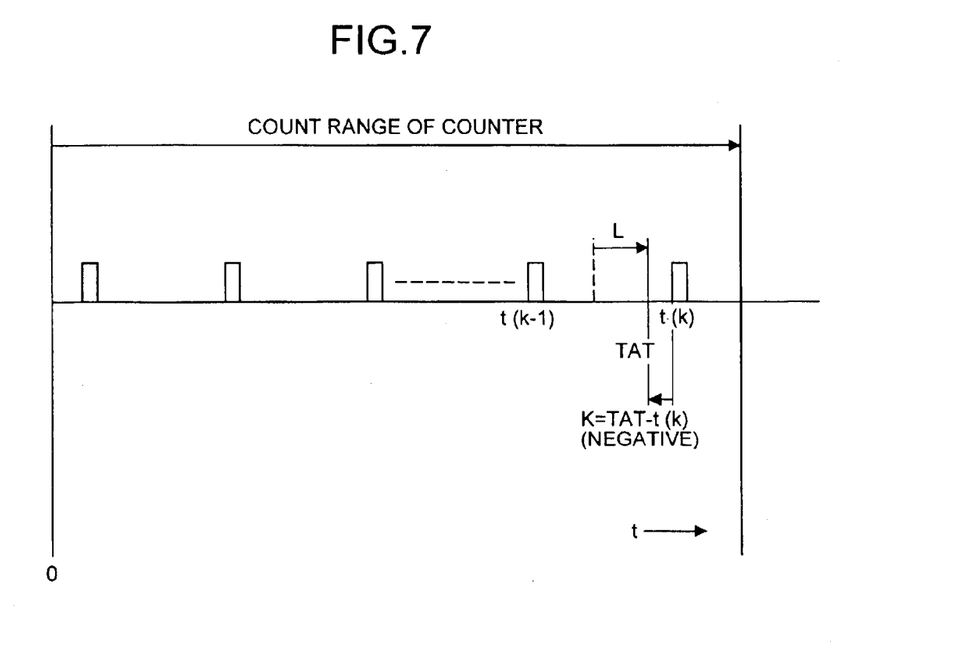
FIG. 7 shows a timing chart of an example when the packet arrival time is later than the estimated arrival time.

The policing judgment will be explained in more detail, taking an example of a packet reception timing shown in FIG. 7 to FIG. 10. In FIG. 7, for example, an example in which the packet arrives later than the estimated packet arrival time [TAT] will be explained.

By adding the minimum packet interarrival time [D] to the previous estimated packet arrival time [TAT], the estimated packet arrival time of the next packet [TAT=TAT+D] is determined (step 207 in FIG. 6). As shown in FIG. 7, when the packet is received at the time later than the estimated packet arrival time [TAT], the relation between the packet arrival time [t(k)] and the estimated packet arrival time [TAT] becomes [TAT<t(k)]. Therefore, the time difference [K=TAT−t(k)] obtained at step 203 becomes negative. In this case, the calculation causes an overflow. However, if the bit width of the counter that can be handled by the calculator 13 is the same as the bit width of the counter used for measurement of time, the calculation result of [K] becomes a positive value, [K=TAT−t(k)+N+1].

At step 204, this value [K] is compared with the counter overflow judgment time [M], and in the case of [t(k)−TAT<N+1−M], the passage of the packet is permitted, and it is judged accurately. However, in the case of [t(k)−TAT≧N+1−M], control proceeds to step 206, and when [t(k)−TAT<N+1−L] is established, the packet is discarded, thereby causing erroneous judgment. The maximum measurement time [N] of the counter is set to a value sufficiently larger than the counter overflow judgment time [M], and hence [t(k)−TAT] becomes no more than [N]. Therefore, the erroneous judgment at step 204 can be suppressed to erroneous judgment within a very short period of time, and hence no practical problem comes up.

Figure 8:
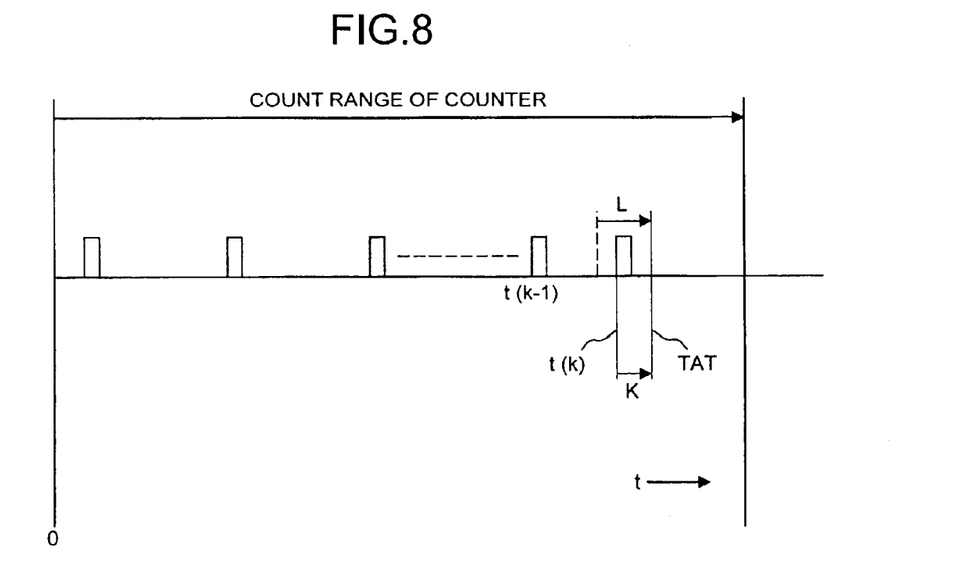
FIG. 8 shows a timing chart of an example when the packet arrival time is earlier than the estimated arrival time.

As shown in FIG. 8, an example in which a packet arrives, for example, earlier than the estimated packet arrival time [TAT] and does not exceed the packet arrival permissible time [L] will be explained below. The value of [K] calculated at step 203 is compared with the counter overflow judgment time [M] at step 204. The counter overflow judgment time [M] is [M=L+D], as described above, and when the packet arrival time [t(k)] is earlier than the estimated packet arrival time [TAT] and does not exceed the packet arrival permissible time [L], this time difference [K] does not exceed the value of counter overflow judgment time [M]. In other words, at step 204, the relation of [K>M] is not established, and at step 206, the time difference [K] is compared with the packet arrival permissible time [L]. Since the calculated value [K] is smaller [K<L] than the packet arrival permissible time [L], it is confirmed that there is an allowance in the packet interarrival time. Hence, the passage of the packet is permitted (step 207).

Figure 9:
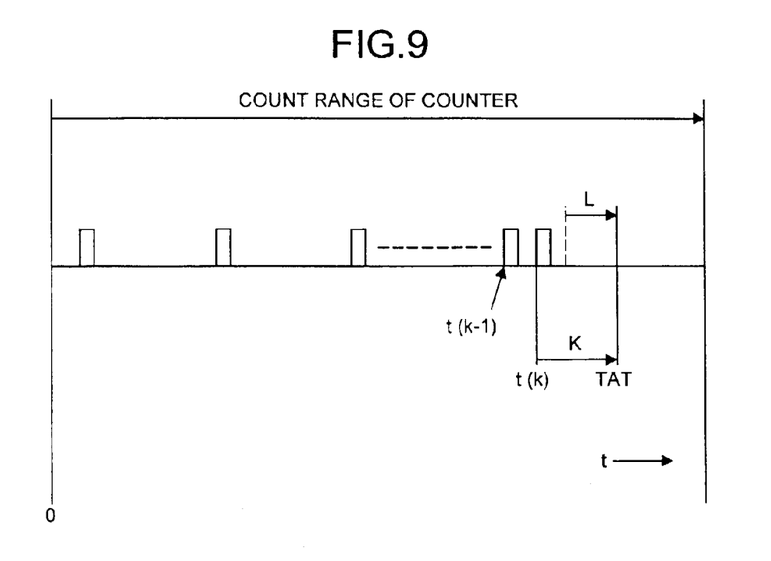
FIG. 9 shows a timing chart of an example when the packet arrival time is earlier than the estimated arrival time.

On the other hand, for example, as shown in FIG. 9, an operation when the next packet arrives before the estimated packet arrival time [TAT], and this packet does not meet the packet arrival permissible time [L], will be explained. In this case, the value of the time difference [K] obtained at step 203 shown in FIG. 6 becomes a positive integer. At step 204, the time difference [K] is compared with a value of the counter overflow judgment time [M] ([L+D]). If a change in the value of [TAT] when the packet arrives earlier than the agreed rate is observed, [TAT] gradually increases every time the packet arrives, but there is the judgment at step 206, and therefore [TAT−t(k)] cannot exceed [L+D]. Accordingly, the relation of [M>K>L] is established, that is, [K≦M]. Therefore, the judgment at step 204, [K>M] is not established, and at step 206, the calculated value [K] is further compared with the packet arrival permissible time [L]. Since the calculated value [K] is larger [K>L] than the packet arrival permissible time [L], this packet is discarded (step 208).

In this manner, the policing control apparatus according to this embodiment can appropriately judge the passage or discarding of the packet when the count value does not overflow in the same manner as that of the conventional policing control apparatus.

Figure 10:
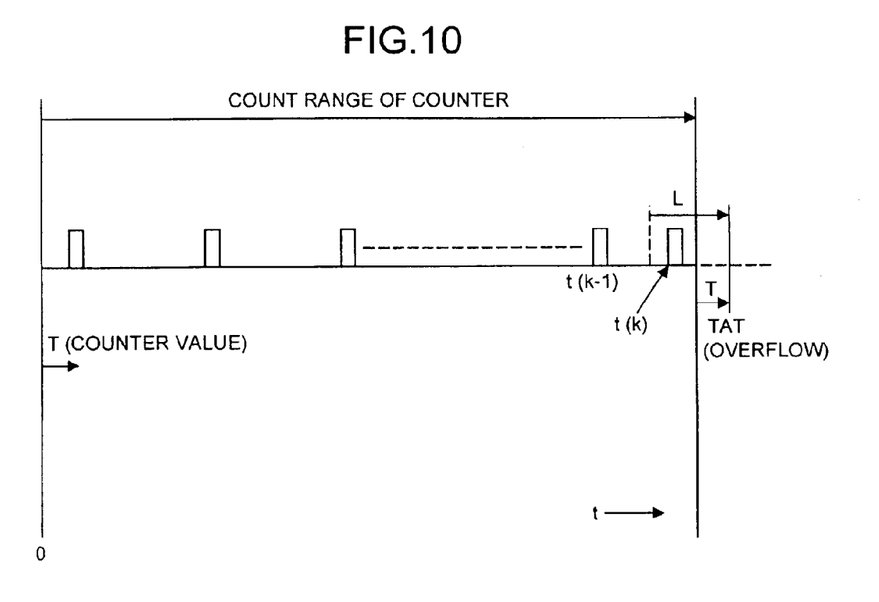
FIG. 10 shows a timing chart of an example when a counter of the estimated arrival time overflows.

The characteristic point of this invention is that even when the count value exceeds the maximum value of the counter and returns to 0, the policing judgment relating to the passage or discarding of the packet can be correctly performed. For example, at step 207 in FIG. 6, it is assumed that when the next estimated packet arrival time [TAT] is calculated, the count range of the counter is exceeded, as shown in FIG. 10. The counter value at this time becomes the overflow state as shown in FIG. 4, and the count value returns to the vicinity of 0, [T1=T2−N−1], though the actually calculated value is T2. This [T1] becomes the next estimated packet arrival time [TAT]. At step 203, the value of [K=TAT−t(k)] is calculated, using the packet received time [t(k)]. This calculation causes underflow, and hence, the calculation result becomes [TAT−t(k)+N+1], but since [TAT=T2−N−1], the calculation result becomes [T2−t(k)], and the same result can be obtained as that of when the overflow does not occur. As a result, the judgment at step 204 and step 206 can be correctly performed.

According to the policing control apparatus in this embodiment, even when the counter of the packet arrival time [TAT] overflows, such a case can be eliminated that a packet supposed to be discarded originally is erroneously passed, as in the conventional policing control apparatus. The overflow phenomenon of the counter occurs without fail, since a counter of a finite length is used. When the algorithm of the policing control apparatus according to this embodiment is used, even if the count value of the counter exceeds the boundary of 0 from the maximum value and overflows to cause a false reversal of time, the policing judgment can be accurately performed, and hence this policing control apparatus is very useful.

Figure 11:
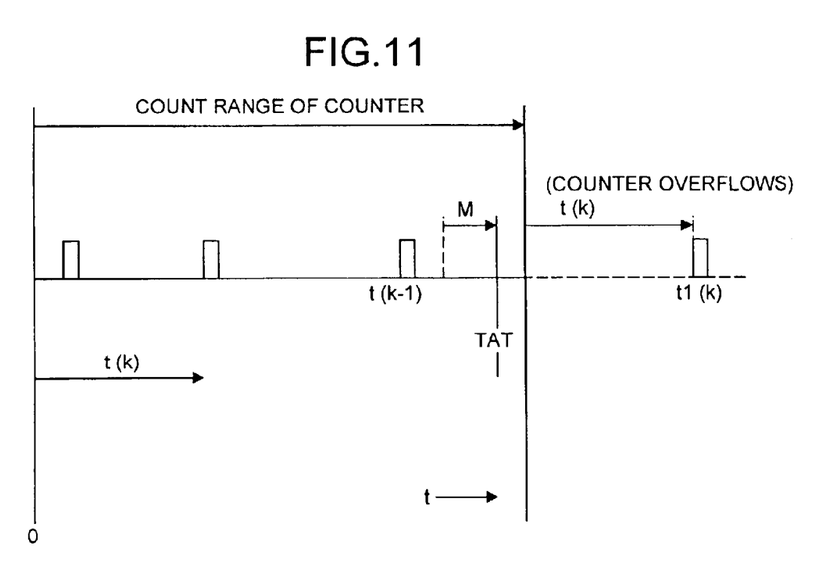
FIG. 11 shows a timing chart of an example when a counter of the packet arrival time overflows.

A second embodiment of this invention will be explained next. In this embodiment, an example will be explained in which even if the count value of the packet received time obtained by using a finite-length counter, exceeds the boundary of 0 from the maximum value and overflows, as described above, the policing control apparatus according to this embodiment can perform accurate policing judgment. For example, as shown in FIG. 11, when the counter of the packet received time [t(k)] overflows, the count value of the overflowed counter exceeds the maximum value of the counter, and becomes [t1(k)]. This received time [t1(k)] is used to calculate the value of [K=TAT−t1(k)] at step 203. At this time, since the received time of the packet overflows and becomes a value close to 0, [t(k)=t1(k)−N−1], hence [TAT>t(k)], and the value of time difference [K] becomes a positive value. Then, at step 204 shown in FIG. 6, this calculated time difference [K] is compared with the counter overflow judgment time [M]. Since [K>M] is established, the passage of the packet is permitted, and after the estimated packet arrival time [TAT] is replaced by [t(k)], the standard packet interarrival time [D] is added thereto, to thereby determine the next estimated packet arrival time [TAT] (step 205, step 207).

In this manner, even if the counter [t(k)] of the packet received time overflows, policing judgment can be performed correctly.

However, if a packet is received later than the estimated packet arrival time [TAT] and the counter of the packet received time [t(k)] overflows to become [t(k)←t1(k)], [K>M] is not established at the judgment at step 204 in FIG. 6 when [t(k)] is smaller than [TAT] but not smaller than [TAT−M]. As a result, an erroneous value is set in [TAT], though [TAT=t(k)+D] is supposed to be set after the packet is passed, and thereby the packet may be discarded.

However, as described above, the counter overflow judgment time [M] is sufficiently small as compared with the maximum measurement time [N] of the counter, the erroneous judgment can be suppressed to erroneous judgment within a very short period of time.

In the network having a variable packet length, it is also possible to use an allowable bit rate that allows a transmission bit of the packet, instead of the standard packet interarrival time [D] at step 207. In this case, [TAT=TAT+B×LEN], obtained by adding a product of a standard bit interval [B] being an inverse number of the allowable bit rate and a length of an arrived packet [LEN] to the estimated packet arrival time [TAT], may be designated as a new estimated packet arrival time.

The maximum measurement time [Tcmax] of the counter may be designated as a time [L+B×LEN<<Tcmax] sufficiently larger than the sum of the packet arrival permissible time [L] and a product [B×LEN] of the standard bit interval [B] and the arrived packet length [LEN], thereby enabling correct control of the frequency band used by the packet flow, even if the reversal of the counter occurs.

On the other hand, in the conventional algorithm, when the counter overflows and the value thereof returns to about 0, a packet to be discarded may be passed. Alternatively, when the reception of the packet flow is stagnant for a while and then packet reception occurs, the counter of the packet arrival time overflows and becomes a value close to 0. In this case, the policing control apparatus continues to discard packets until the packet arrival time [t(k)] exceeds the value of the estimated packet arrival time [TAT] (until the time is delayed).

However, according to the algorithm of the router (policing control apparatus) of the present invention, even if the counter of the estimated packet arrival time [TAT] or the counter of the packet arrival time [t(k)] overflows, it is possible to greatly improve the erroneous policing judgment.

As described above, according to the policing control apparatus of this invention, even if the counter value exceeds 0 to cause a false reversal of time, by adding the algorithm in which an intermediate variable [K] is provided as a time difference, [K=TAT−t(k)] is calculated, and the calculated value is compared with [M=L+D], it becomes possible to greatly improve the problem on the erroneous policing judgment, while making use of the conventional hardware resource.

According to the policing control apparatus of this invention, it is not necessary to increase a word length of the counter unreasonably in order to reduce the overflow of the counter, and therefore there are large practical effects such that policing control with high reliability can be easily realized.

INDUSTRIAL APPLICABILITY

As described above, the policing control method and apparatus and the network system using the policing control apparatus according to the present invention are suitable for network systems such as a packet communication network, for example, ATM network and IP network, in which even if a count value of a counter for managing packet interarrival times overflows to cause a false reversal of time, policing judgment can be accurately performed.

What is claimed is:

1. A policing control method for restricting passage of packets transmitted on a network in a different traffic volume, the policing control method comprising:

an arrival time detection step of detecting an arrival time of a packet, when the packet arrives;

a setting step of presetting an estimated packet arrival time and a packet arrival permissible time;

a calculation step of calculating a time difference between the detected packet arrival time and the preset estimated packet arrival time;

a first judgment step of judging a difference in magnitude between the calculated time difference and an additional value by comparing the time difference with the additional value obtained by adding a standard interarrival time of packets to the preset packet arrival permissible time;

a second judgment step of judging a difference in magnitude between the time difference and the packet arrival permissible time by comparing the time difference and the packet arrival permissible time, when it is judged at the first judgment step that the time difference is not larger than the additional value;

a discarding step of discarding the packet, when it is judged at the second judgment step that the time difference is larger than the packet arrival permissible time; and a permitting step of permitting passage of the packet, when it is judged at the first judgment step that the time difference is larger than the additional value, or it is judged at the second judgment step that the time difference is not larger than the packet arrival permissible time.

2. The policing control method according to claim 1, further comprising a resetting step of resetting a sum of the estimated packet arrival time and the standard interarrival time of packets as a new estimated packet arrival time, when the passage of the packet is permitted at the permitting step.

3. The policing control method according to claim 1, further comprising a resetting step of resetting a value obtained by adding the estimated packet arrival time to a time consisting of a product of a standard bit interval and a packet length of the arrived packet, as a new estimated packet arrival time, when the passage of the packet is permitted at the permitting step.

4. A policing control apparatus that restricts passage of packets transmitted on a network in a different traffic volume, the policing control apparatus comprising:

a detection unit that detects an arrival time of a packet;

a calculation unit that calculates a time difference between the packet arrival time and a preset estimated packet arrival time;

a first comparison unit that compares the calculated time difference with an additional value obtained by adding a standard interarrival time of packets to a preset packet arrival permissible time;

a second comparison unit that compares the time difference with the packet arrival permissible time, based on a result of the comparison by the first comparison unit; and a permitting unit that permits passage of the packet or discarding of the packet, based on the comparison result by the first comparison unit, or the comparison results by the first and second comparison units.

5. The policing control apparatus according to claim 4, further comprising a setting unit that sets a sum of the estimated packet arrival time and the standard interarrival time of packets as a new estimated packet arrival time, when the permitting unit permits the passage of the packet.

6. The policing control apparatus according to claim 4, further comprising a setting unit that sets a value obtained by adding the estimated packet arrival time to a time consisting of a product of a standard bit interval and a packet length of the arrived packet, as a new estimated-packet arrival time, when the permitting unit permits the passage of the packet.

7. The policing control apparatus according to claim 4, wherein the permitting unit permits the passage of the packet, when the time difference is larger than the additional value based on the comparison result by the first comparison unit, or when the time difference is not larger than the additional value based on the comparison result by the first comparison unit and the time difference is not larger than the packet arrival permissible time based on the comparison result by the second comparison unit.

8. The policing control apparatus according to claim 4, wherein the permitting unit discards the packet, when the time difference is not larger than the additional value based on the comparison result by the first comparison unit and when the time difference is larger than the packet arrival permissible time based on the comparison result by the second comparison unit.

9. The policing control apparatus according to claim 4, wherein the permitting unit permits the passage of the packet, when the time difference is larger than the additional value based on the comparison result by the first comparison unit, or when the time difference is not larger than the additional value based on the comparison result by the first comparison unit and the time difference is not larger than the packet arrival permissible time based on the comparison result by the second comparison unit; and the permitting unit discards the packet, when the time difference is not larger than the additional value based on the comparison result by the first comparison unit and the time difference is larger than the packet arrival permissible time based on the comparison result by the second comparison unit.

10. The policing control apparatus according to claim 4, wherein the calculation unit has a counter for managing interval times of the transmitted packets, and a maximum measurement time of the counter is set to a time sufficiently larger than a sum of a maximum value of a bucket counter in a leaky bucket algorithm and a minimum interval time of packets.

11. A network system built by at least a plurality of subscriber hosts and a backbone network for performing transfer of packets between the subscriber hosts and the backbone network, the system comprising:

a policing control apparatus that is connected between the subscriber hosts and the backbone network, and restricts passage of the packets in a different traffic volume, the policing control apparatus including a detection unit that detects an arrival time of a packet;

a calculation unit that calculates a time difference between the packet arrival time and a preset estimated packet arrival time;

a first comparison unit that compares the calculated time difference with an additional value obtained by adding a standard interarrival time of packets to a preset packet arrival permissible time;

a second comparison unit that compares the time difference with the packet arrival permissible time, based on a result of the comparison by the first comparison unit; and a permitting unit that permits passage of the packet or discarding of the packet, based on the comparison result by the first comparison unit, or the comparison results by the first and second comparison units.

* * * * *